United States Patent [19]

Briggs et al.

[11] 4,309,981
[45] Jan. 12, 1982

[54] SOLAR WINDOW SYSTEM

[76] Inventors: James D. Briggs, Star Rte. Box 574-637, Kerrville, Tex. 78028; Ben Mizell, 6703 Heatherbrook, San Antonio, Tex. 78238

[21] Appl. No.: 164,133

[22] Filed: Jun. 30, 1980

[51] Int. Cl.³ .............................................. F24J 3/02
[52] U.S. Cl. ................................. 126/417; 126/439; 126/428; 126/429
[58] Field of Search ............... 126/417, 428, 450, 438, 126/439, 451

[56] References Cited

U.S. PATENT DOCUMENTS

| | | | |
|---|---|---|---|
| 2,857,634 | 10/1958 | Garbade et al. | 126/419 X |
| 2,969,918 | 1/1961 | Phelps | 126/419 |
| 3,860,055 | 1/1975 | Wild | 126/419 X |
| 4,149,520 | 4/1979 | Arent | 126/451 |
| 4,212,289 | 7/1980 | Hebert | 126/430 X |

*Primary Examiner*—Larry Jones
*Attorney, Agent, or Firm*—Gunn, Lee & Jackson

[57] ABSTRACT

A solar window system designed to be fitted into a window frame of a building or over an existing window, the invention window system functioning as a combination shade awning, solar reflector and thermal-security shutter. The invention solar window system comprises a frame, an adjustable insulated panel having reflective surfaces and supporting adjusting means for the panel. Glass may or may not be fitted into the frame depending upon the solar window system's intended use. According to the adjustment of the panel, the invention window system can function as a shade awning, as a solar reflector, or as a thermal-security shutter.

12 Claims, 15 Drawing Figures

SOLAR WINDOW SYSTEM

BACKGROUND OF THE INVENTION

At a time when energy conservation is of primary importance, numerous products have been developed to assist in conserving the ever-diminishing supply of energy. Compact fuel efficient automobiles are increasing in numbers. Ceiling fans, once the sole source of cooling in buildings have become fashionable again. Windmills long abandoned as an energy-producing source are even being rediscovered.

Ways to tap the energy of the sun are constantly being explored and many devices exist that utilize the sun as an energy source. The invention solar window system is one such device that uses the rays of the sun in several ways. Depending upon the configuration of the invention solar window system, a building may be heated or kept cool or insulated from the environment. Positioned to reflect the sun's rays into a building, the invention solar window system aids in heating the interior of the building. Positioned to reflect the sun's rays away from a building, a building may be kept cool using the invention solar window system. In yet a third position, the invention solar window system may insulate a building from loss of internal heat and entry of external cold as well as provide a means of securing the building against intruders. All of these capabilities can be realized by the invention solar window system.

BRIEF DESCRIPTION OF THE PRIOR ART

In U.S. Pat. No. 1,747,928, J. W. D. Chesney proposed a series of curved reflectors arranged on a window to reflect sunlight rays into buildings. Smith, in his U.S. Pat. No. 4,102,329, gathered sunlight reflected off shiny support surfaces in collecting units, the collecting units and reflecting support surfaces being located on a roof or wall of a building.

Similar to Smith, Pulver in U.S. Pat. No. 3,935,897 collected sunlight in collecting units, the collecting units being used as shading for windows in buildings having insulated opaque and vision glass. No reflecting means were utilized.

A combination shutter/awning was patented by Bomerscheim, U.S. Pat. No. 2,853,128, and Shoen, U.S. Pat. No. 2,716,785. Neither patents disclose nor contemplate any reflecting means in conjunction with the shutter/awning combination.

A solar heat window unit is shown in Arent, U.S. Pat. No. 4,043,316. The unit comprises a frame having a lower window unit and a pair of upper window units. A first panel member hingedly secured to the window frame opens or closes to provide a reflective surface for the rays of the sun or an insulation means, respectively. A second panel member is also hingedly secured to the window frame an also opens or closes. In the closed position, the second panel member protects and insulates the upper window units while in the open position, the panel provides shade. The inner surface of the second panel member is relfective to enable the second panel member to reflect rays of the sun onto the lower window units.

SUMMARY OF THE INVENTION

It is an object of the present invention to provide a solar window system that may be used instead of a conventional window in a building or may be fitted over an existing window, the invention solar window system comprising a window frame, an adjustable hinged insulated panel fitted over the window frame, hook means to retain the panel in the frame and means to adjust the position of the panel. Visual glass may or may not be fitted in the window frame of the invention solar window system depending upon whether the invention solar window system is to be used in lieu of a conventional window or is to be fitted over an existing conventional window. Subject to its position relative to the building to which it is attached, the invention solar window system functions as a shade awning, solar reflector or thermal-security shutter.

DESCRIPTION OF THE PREFERRED EMBODIMENT

Figure 1:
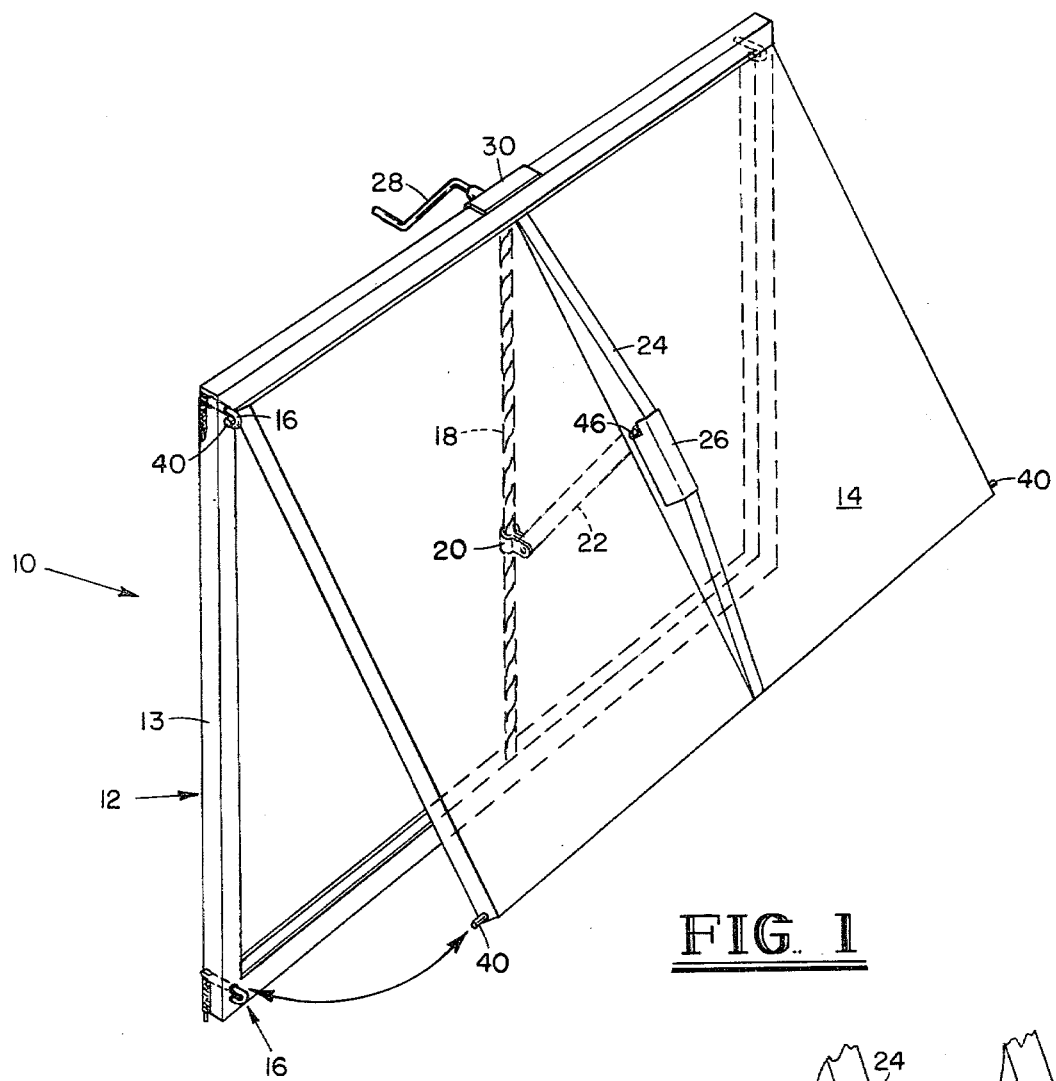
FIG. 1 is a perspective view of the invention solar window system functioning as a shade awning.

As discussed previously, the invention solar window system may function in three ways—as a shade awning, as a solar reflector, or as a thermal-security shutter. As shown in FIG. 1, the solar window system 10 is functioning as a shade awning.

A frame 12 of predetermined dimensions according to its place of installation hingedly secures insulated, reflective panel 14 by means of hooks 16. Located approximately in the center of frame 12 and extending the height of the frame is worm 18 having attached thereto threaded collar 20 to which arm 22 is pivotally engaged. In line with worm 18 located on panel 14 and extending from top to bottom of panel 14 is support 24. Notched cap 26 positioned approximately in the center of support 24 retains the pinned end (not shown) of arm 22. Crank 28 is attached to frame 12 by plate 30.

When hinged as shown in FIG. 1, the invention solar window system functions as a solar reflector. Rays of the sun striking the surface of panel 14 are reflected away and prevented from entering the building to which the invention window is mounted. To receive maximum benefit of its reflective capabilities, panel 14 is adjusted by rotating crank 28. Turning crank 28 moves threaded collar 20 along worm 18. Arm 22 pivotally connected to threaded collar 20 thereby moves and changes the angle of the panel 14 relative to the sun.

Although shown in the drawings as having a single worm 18 and arm 22, the invention solar window system 10 may have any number of worms and arms to support and adjust panel 14. The number of worms and arms is dependent upon the size of the solar window 10. For example, to support and adjust a panel on a window system 3 feet high and 5 feet wide, a single worm and arm as illustrated in FIG. 1 would be sufficient. However, to support and adjust a larger window system such as one 5 feet high and 6 feet wide, a worm/arm combination in each end vertical 13 would be necessary. A passageway could be cut in verticals 13 to allow arm 22 to move freely by connector 20 traveling along worm 18. Likewise as in FIG. 1, supports 24 having notched cap 26 and slots 50 could be formed on each end of panel 14 to accept the pin 48 end of arm 22. The number of worm/arm combinations is therefore dependent upon the size and weight of solar window system 10 and although not illustrated in the drawings, the invention encompasses and contemplates the use of multiple worm/arm combinations.

Figure 2:
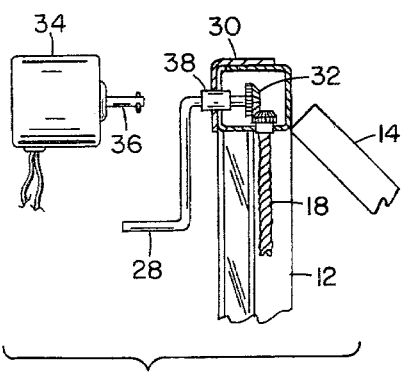
FIG. 2 is a cutaway upper center view of FIG. 1 of the invention solar window system showing two means to adjust the panel.

FIG. 2 shows alternative means to adjust the angle of panel 14. As depicted, crank 28 having bevel gears 32 meshes with bevel gears 32 of worm 18. Turning crank 28 rotates worm 18 which in turn changes the angle of panel 14 by movement of arm 22 pivotally secured to threaded collar 20 positioned on worm 18. Instead of adjusting the angle of panel 14 by manual means, an electric motor 34 having a shaft 36 can be used. Crank 28 is removed from adapter 38 and shaft 36 of motor 34 is inserted. Any type of electric motor may be utilized, such as a household hand-held drill.

Figures 3, 4A, 4B:
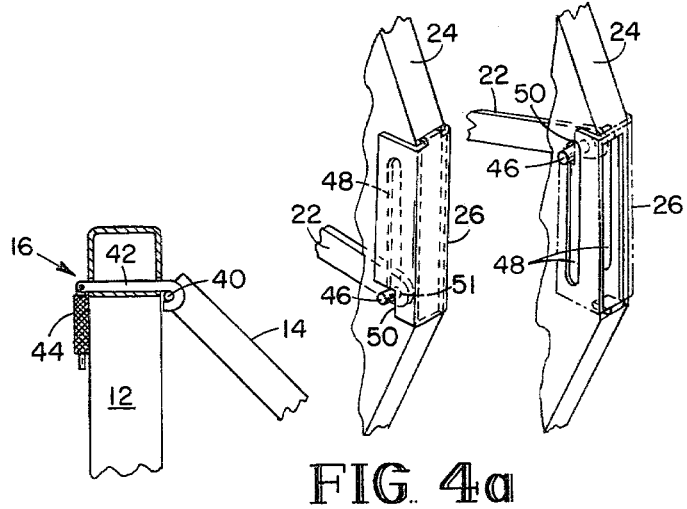
FIG. 3 is a cutaway end view of the invention solar window system showing the hinge mechanism holding the panel.
FIG. 4a is a perspective view of the center hinging mechanism of the invention solar window system when the window functions as a solar reflector.
FIG. 4b is a perspective view of the center hinging mechanism of the invention solar window system when the window functions as a shade awning.

A detailed view of the hooks 16 and their relationship to the invention is shown in FIG. 3. Hook 16 comprises a shaft 42 pivotally connected to extension 44. Hook 16 retains or releases bar 40 of panel 14. Extension 44 of hook 16 lies flush against frame 12 and at right angles to the hook shaft 42 when hook 16 is locked, in other words retaining panel 14 by hook 16 engaging bar 40. Bringing extension 44 of hook 16 up and in line with hook shaft 42 and pushing forward projects hook 16 outwardly thereby releasing bar 40. Panel 14 is then released to be repositioned if necessary. Instead of pushing hook 16 completely forward, bar 40 may be disengaged by pushing hook 16 forward enough to loosen the contact between the hook and the window frame 12 and then twisting hook 16.

Hooks 16 are located at each corner of frame 12. Hook shaft 42 is inside frame 12 while extension 44 of hook 16 is outside of frame 12. Upper hooks retain panel 14 when the window system 10 is to be used as a shade awning. Lower hooks 16 retain panel 14 when the solar reflector function of window system 10 is desired. Both upper and lower hooks 16 are used when the window system 10 is to function as a thermal-security shutter.

FIGS. 4a and 4b show the retaining means of the forward portion of arm 22. Pin 46 permanently fits in a hole at the forward end of arm 22. When window system 10 is to be used as a shade awning, arm 22 is held in the position shown in FIGS. 1 and 4b. Notch 50 in cap 26 holds pin 46 at the top of slot 48. When window system 10 functions as a solar reflector as shown in FIG. 5a, arm 22 is held in the position shown in FIG. 4a. Notched cap 26 is turned to hold pin 46 at the bottom of slot 48. When the window system 10 is used as a thermal-security shutter, arm 22 is parallel to worm 18 and support 24 and pin 46 can be retained either at the top or bottom of slot 48 by notched cap 26.

Figure 5:
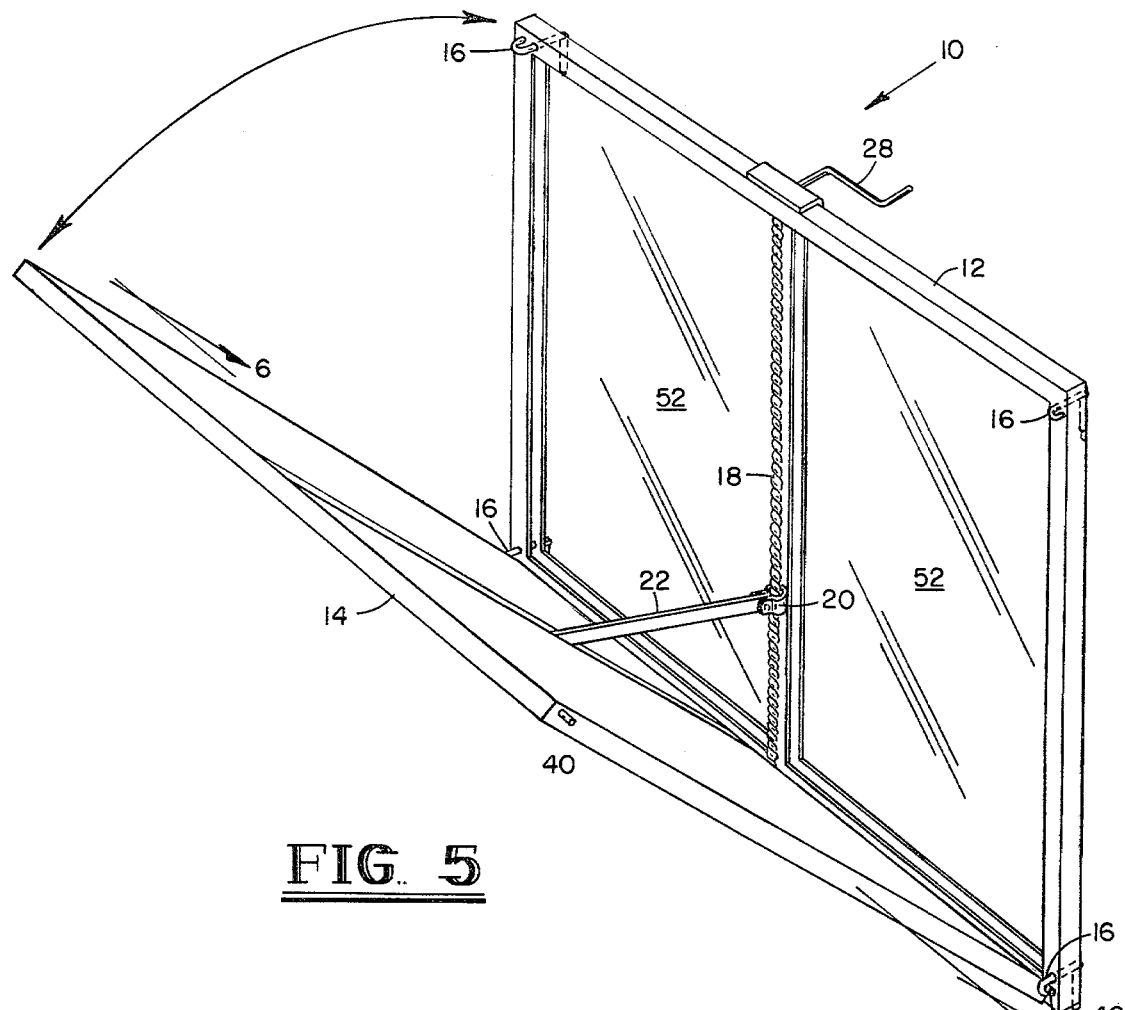
FIG. 5 is a perspective view of the invention solar window system having visual glass installed in the frame and the window system functioning as a solar reflector.

FIG. 5 shows the invention solar window system 10 adjusted to be used as a solar reflector. In contrast to the window system in FIG. 1, lower hooks 16 now retain panel 14. Again rotating crank 28 turns worm 18 thereby causing arm 22 to move and adjust the angle of panel 14. Glass 52 has been installed in frame 12. Although not shown, glass can also be installed in the shade awning solar window system of FIG. 1. Likewise, the solar refelector solar window system of FIG. 5 can also function without glass. To have glass present in any embodiment of the invention solar window system is optional and its presence or absence does not detract from the intended function of the window.

To convert the invention solar window system from a shade awning as shown in FIG. 1 to a solar reflector as shown in FIG. 5, a specific procedure must be followed. With the window system 10 in an open position, cap 26 is removed, arm 22 with attended pin 46 is slid downward in slot 48 and cap 26 is replaced so notch 50 will hold pin 46 in the lower position (as shown in detail in FIG. 4a). Crank 28 is then rotated until panel 14 closes onto frame 12. Hooks 16 on the lower part of frame 12 are then actuated to secure lower bars 40 of panel 14. Upper hooks 16 are disengaged from upper bars 40 of panel 14. Finally crank 28 is rotated and panel 14 opens in the position to function as a solar reflector as depicted in FIG. 5.

To change the invention window system from solar reflector to shade awning, the procedure set forth above is repeated: cap 26 is removed, arm 22 and pin 46 slid upward in slot 50, cap 26 replaced so notch 50 holds pin 46 in the upward position, crank 28 rotated to bring panel 14 upward to the closed position, upper hooks 16 actuated to engage upper bars 40 of panel 14, lower hooks 16 disengaged from lower bars 40, and finally panel 14 opened into the shade awning position by rotation of crank 28.

Figure 6:
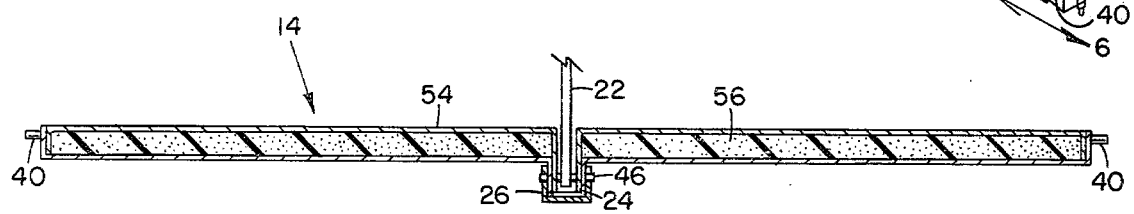
FIG. 6 is a sectional view of the panel of invention solar window system taken along lines 6—6 of FIG. 5.

A cross-sectional view of the insulted panel 14 taken along lines 6—6 in FIG. 5 is shown in FIG. 6. The panel 14 having bars 40 and upper and lower reflecting surfaces 54 enclose a lightweight insulative material 56, such as polystyrene or fiberglass. The reflecting surfaces may be any material that will reflect the sun's rays, such as aluminum or any material painted white or other highly reflective color. Arm 22, having pin 46 retained in the slot of support 24, is clearly shown. Notched cap 26 secures pin 46 in position.

Figure 7:
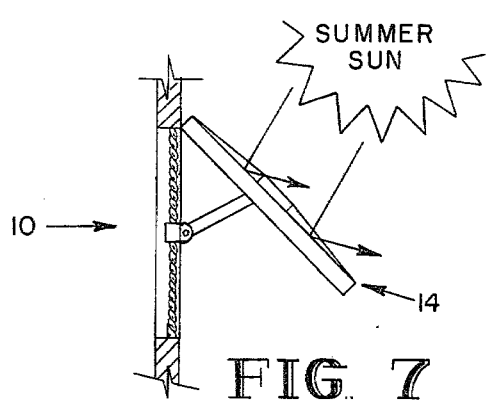
FIG. 7 is a schematic view of the invention solar window system functioning as a shade awning.
Figure 8:
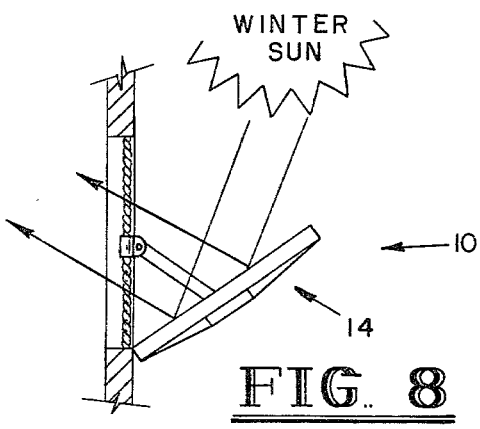
FIG. 8 is a schematic view of the invention solar window system functioning as a solar reflector.

Illustrations of the operation of the invention solar window system are schematically shown in FIGS. 7 and 8. In FIG. 7, solar window system 10 is positioned to function as a shade awning. In the summer, it is preferred to reflect the sun's rays away from a building to prevent solar heat from entering the building through glazed surfaces. Hence, when the summer sun's rays strike the reflective surface of the shade awning solar window system, they are reflected away, In contrast, the winter sun's rays are desired to aid in increasing the internal temperature of a building. Therefore, the invention solar window system is positioned as in FIG. 8 to function as a solar reflector solar window system. Rays from the winter sun strike the reflective surface of the invention solar window system and are reflected through glazed surfaces and into the building.

An alternative means of operating the invention solar window system is illustrated in FIGS. 9-14. This alternative means may be used for any size window although it is preferably utilized for small windows such as those in bathrooms or utility rooms.

Figure 9:
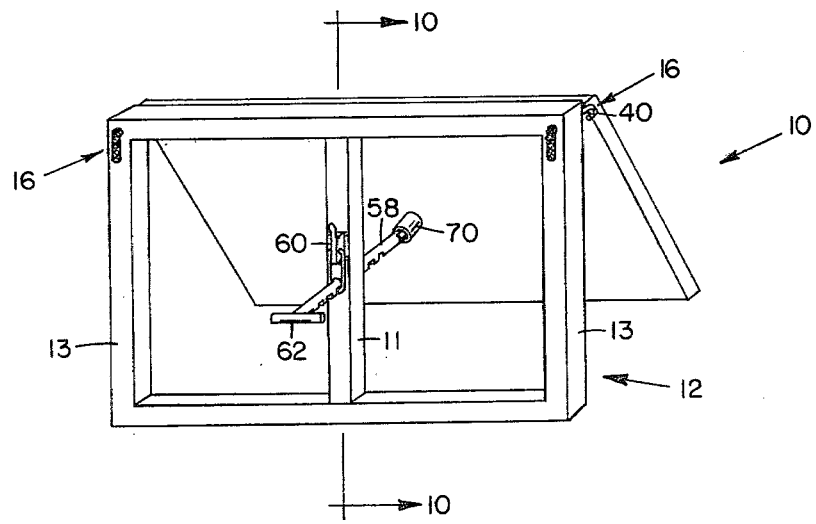
FIG. 9 is a perspective view of the invention solar window system utilizing an alternative means of operating the window.

FIG. 9 shows the invention solar window system 10 functioning as a shade awning. The same principles apply to the window system shown in FIG. 9 as the window system of FIGS. 1 and 5; namely, the angle of panel 14 may be changed as desired to receive the full benefits of the window system functioning either as a shade awning or as a solar reflector. Changing the angle of the panel 14 is accomplished by adjusting notched pole in center vertical 11 and securing the pole by latch 60. Movement of notched pole 58 is facilitated by handle 62.

Figure 10:
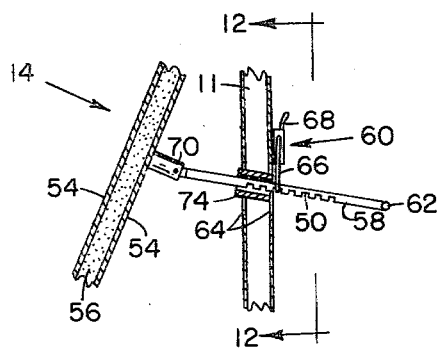
FIG. 10 is a sectional end view of the invention solar window system taken along lines 10—10 of FIG. 9.

A more detailed view of the mechanism to operate panel 14 is shown in FIG. 10. Aperture 64 has been made in center vertical 11 to allow tube 74 to freely pivot inside vertical 11. Tube 74 is held in position in vertical 11 by pins 46 that project through holes in walls of vertical 11 (not shown). Tube 74 is capable of rotating full circle. Notched pole 58 and cylinder 70 slide through tube 74. Pushing pole 58 toward panel 14 by handle 62 slides pole 58 through tube 74 and moves panel 14 outward. When the desired angle of panel 14 is reached, loop 66 of latch 60 is fitted into a notch 50 immediately adjacent center vertical 11. Buckle 58 is then pressed upward and against center vertical 11 until locked, thereby securing pole 58 and hence panel 14 into position. To change the angle of panel 14, buckle 68 is disengaged, loop 66 falls free and pole 58 can be maneuvered into the new position. When the new position is determined, pole 58 is once again secured by latch 60 as described above.

Figure 11:
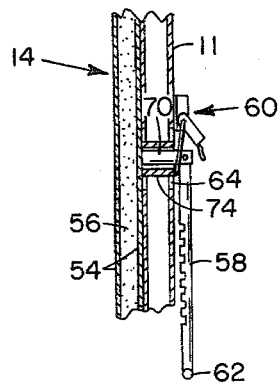
FIG. 11 is a sectional end view of the invention solar window system of FIG. 9 in the closed position.

For panel 14 to fit flush against vertical 11 (and thereby against frame 12) as shown in FIG. 11, a cylinder 70 permanently attached to the interior reflective surface 54 of panel 14 slides into tube 74 pivotally secured in center vertical 11. To permit panel 14 to both fit flush against frame 12 and vertical 11 and still be maneuverable as a shade awning or solar reflector, cylinder 70 pivotally connects to notched pole 58. Cylinder 70 is of sufficient length to extend the width of center vertical 11 and yet allow pole 58 to pivot downward to fit in close relationship to center vertical 11, thereby providing a compact window unit.

Figure 12:
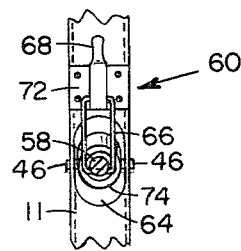
FIG. 12 is a sectional view of the invention solar window system taken along lines 12—12 of FIG. 10.

FIG. 12, a sectional view taken along lines 12—12 of FIG. 10, clearly shows how latch 60 having loop 66 and buckle 68 secures notched pole 58 into position. Plate 72 provides attachment means for latch 60 to center vertical 11. Plate 72 may be held onto center vertical 11 by any number of means, such as welds or screws 72 as shown.

Figure 13:
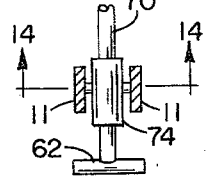
FIG. 13 is a partial top view of the invention solar window system taken along lines 13—13 of FIG. 14 illustrating alternative means of operating the window.

An alternative means of enabling notched pole 58 to maneuver to position panel 14 is shown in FIG. 13. Instead of a single center vertical as shown in FIGS. 9-12 with a pivotal tube 74 secured therein, a pair of spaced apart center veticals 11 are utilized in the invention solar window system 10. As in FIGS. 9-12, pivotally connecting the two verticals 11 and capable of rotating full circle between verticals 11 is tube 74. This tube 74 provides the guide means for notched pole 58 as pole 58 is moved to adjust the angle of panel 14. The cylinder 70 is still attached to the surface 54 of panel 14 and pivotally connected to notched pole 58 as discussed for FIGS. 9-12. The latch 60 and its loop 66 and buckle 68 are, and their cooperation with notched pole 58 are likewise, the same as discussed for FIGS. 9-12. In the embodiment of FIG. 13, tube 74 is allowed to freely rotate to facilitate sliding cylinder 70 and notched pole 58 through same thereby decrease the work necessary to adjust the invention window system. As shown, cylinder 70 is passing through tube 74 and notched pole 58 is hidden.

Figure 14:
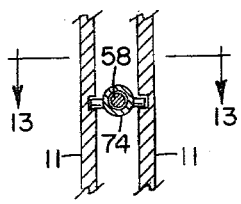
FIG. 14 is a sectional view of the invention solar window system taken along lines 14—14 of FIG. 13.

FIG. 14, a sectional view along lines 14—14 of FIG. 13, illustrates tube 74 pivotally connected to center verticals 11 and notched pole 58 slidably engaged therewith. A top view taken along lines 13—13 of the verticals/tube arrangement is shown in FIG. 13.

As discussed for the mechanisms shown in FIGS. 1 and 5, the invention solar window systems of FIGS. 9 and 13 are not limited to a single panel adjusting mechanism. If desired, a pole could be present in each end vertical 13 in lieu of the single pole in the center vertical 11. Both single and multiple panel adjusting mechanisms are encompassed and contemplated by the present invention.

The invention solar window system functioning any of three ways previously discussed has many advantages. As a thermal-security shutter, the invention solar window system provides an insulated storm shutter to fit snugly against the outside of a building. In addition, the invention thermal-security solar window system serves as a storm shutter such as for hurricanes and can also be latched as a security shutter. As a shade awning solar window system, the invention when mounted on north, east or west windows, prevents low early morning and late afternoon solar heat rays from radiating through glazed windows. In addition, the shade awning solar window system can shade out unwanted solar radiation through south facing windows in the summertime. The invention window system as a solar reflector when mounted on the south side of buildings, adds supplementary solar heating in the wintertime.

The construction and operation of the device of this invention has been described in detail. What is desired to be claimed is all modifications and adaptations of this invention not departing from the scope of equivalents as defined in the appended claims.

We claim:

1. A solar window system capable of functioning as a shade awning, a solar reflector and a thermal-security shutter, said window comprising:

a window frame of predetermined dimensions;

a single mutli-purpose, insulated panel of similar dimensions, said panel being reflective on both sides;

first means for alternately connecting said panel pivotally, a first position of said panel being pivotally connected to said frame at a top thereof to function as said shade awning;

second means for alternately connecting said panel pivotally, a second position of said panel being pivotally connected to said frame at a bottom thereof to function as said solar reflector; and means for securing said panel in a third position against said frame as said thermal-security shutter; and means to adjust the inclination of said panel relative to said window frame by a single set of actuating mechanisms;

said first means for alternately connecting and said second means for alternately connecting forming said securing means and providing separate parts of said means to adjust, said first means for alternately connecting being disconnected in said second position and said second means for alternately connecting being disconnected in said first position.

2. The solar window system of claim 1 wherein said inclination adjusting means comprises:

at least one vertical worm attached to said window frame;

at least one vertical support attached to said panel and opposite said worm;

at least one movable arm havng one end attached to said worm by a connector and an opposite end secured to said support; and means to rotate said worm.

3. The solar window system of claim 2 wherein each of said arms moves within a slot in each of said supports by means of a pin engaged with said arm.

4. The solar window system of claim 3 wherein said pin is held in a desired position in said slot by a notched cap, said notched cap fitting over the slotted area of said support.

5. The solar window system of claim 2 wherein said means to rotate said worm comprises an adapter having bevel gears meshing bevel gears secured to each of said worms, said adapter capable of receiving a means to rotate said bevel gears.

6. The solar window system of claim 5 wherein said means to rotate said bevel gears is selected from the group consisting of a crank and electric motor with shaft.

7. The solar window system of claim 1 wherein said panel comprises an insulated material sandwiched between two sheets of reflective material.

8. The solar window system of claim 1 wherein said inclination adjusting means comprises:

at least one notched pole having one end pivotally connected to a cylinder permanently secured to said panel, said notched pole reciprocating through a vertical support member of said window frame; and at least one latch attached to said window frame of said solar window, said latch cooperating with said notched pole to secure said panel of said window in a fixed position.

9. The solar window system of claim 8 wherein said notched pole reciprocates through a tube pivotally connected to a pair of closely spaced apart verticals.

10. The solar window system of claim 1, 2 or 8 wherein said means for connecting said panel to said window frame are hooks.

11. The solar window system of claim 10 wherein said hooks comprise a hook shaft and an extension, said hook shaft located inside said window frame and said extension located outside said window frame.

12. The solar window system of claim 11 wherein said hooks are positioned near the four corners of said window frame.

* * * * *